(12) United States Patent
Higgins et al.

(10) Patent No.: US 11,511,183 B2
(45) Date of Patent: Nov. 29, 2022

(54) HAND-HELD CONTROLLER USING SENSORS FOR HAND DISAMBIGUATION

(71) Applicant: Meta Platforms Technologies, LLC, Menlo Park, CA (US)

(72) Inventors: Jason Andrew Higgins, Seattle, WA (US); Peter Wesley Bristol, Seattle, WA (US); Glen Jason Tompkins, Woodinville, WA (US); Khaled Boulos, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/150,896

(22) Filed: Jan. 15, 2021

(65) Prior Publication Data
US 2021/0129013 A1 May 6, 2021

Related U.S. Application Data

(62) Division of application No. 15/858,416, filed on Dec. 29, 2017, now Pat. No. 10,912,990.

(51) Int. Cl.
*A63F 13/24* (2014.01)
*A63F 13/213* (2014.01)
*A63F 13/214* (2014.01)

(52) U.S. Cl.
CPC .......... *A63F 13/214* (2014.09); *A63F 13/213* (2014.09); *A63F 13/24* (2014.09)

(58) Field of Classification Search
CPC ...... G06F 3/016; G06F 3/0338; A63F 13/214; A63F 13/213; A63F 13/24
See application file for complete search history.

(56) References Cited

U.S. PATENT DOCUMENTS

| 5,764,164 A | 6/1998 | Cartabiano et al. |
| 6,572,108 B1 | 6/2003 | Bristow |
| 8,570,273 B1 | 10/2013 | Smith |
| D772,986 S | 11/2016 | Chen et al. |

(Continued)

FOREIGN PATENT DOCUMENTS

| CN | 203261391 U | 10/2013 |
| EP | 3065036 A1 | 9/2016 |

(Continued)

OTHER PUBLICATIONS

European Extended Search Report, European Application No. 17195995.0, dated Dec. 22, 2017, 7 pages.

(Continued)

*Primary Examiner* — Kevin M Nguyen
(74) *Attorney, Agent, or Firm* — Fenwick & West LLP

(57) ABSTRACT

A hand-held controller includes a handle extending in a longitudinal direction. The handle is shaped and dimensioned to be grasped by a hand of a user. A ring is attached to an end of the handle and surrounds a thumb of the user when the handle is grasped by the hand of the user. The ring has an annular surface defining a plane that forms a predetermined angle with respect to the longitudinal direction. The ring also has a curved outer surface. A sensor is embedded within the ring or mounted on a side surface of the handle to detect whether the hand of the user grasping the handle is a right hand of the user or a left hand of the user.

18 Claims, 10 Drawing Sheets

(56) References Cited

U.S. PATENT DOCUMENTS

| | | | |
|---|---|---|---|
| 9,913,525 | B2 | 3/2018 | Mine et al. |
| 10,139,966 | B2 | 11/2018 | Pelis et al. |
| 10,347,144 | B2 | 7/2019 | Subiakto |
| 10,459,495 | B2 | 10/2019 | Griffin |
| 10,585,497 | B2 | 3/2020 | Park |
| 2002/0171625 | A1 | 11/2002 | Rothchild |
| 2003/0038783 | A1 | 2/2003 | Baughman |
| 2004/0142749 | A1 | 7/2004 | Ishimaru et al. |
| 2005/0197205 | A1 | 9/2005 | Hale |
| 2006/0164383 | A1 | 7/2006 | Machin et al. |
| 2007/0091070 | A1 | 4/2007 | Larsen et al. |
| 2008/0042995 | A1 | 2/2008 | Li et al. |
| 2009/0153477 | A1 | 6/2009 | Saenz |
| 2009/0205878 | A1 | 8/2009 | Taylor |
| 2010/0328205 | A1 | 12/2010 | Cheng |
| 2011/0037695 | A1 | 2/2011 | Bor et al. |
| 2011/0157019 | A1 | 6/2011 | Miura et al. |
| 2013/0178293 | A1 | 7/2013 | Nakayama et al. |
| 2013/0215024 | A1 | 8/2013 | Nakayama et al. |
| 2013/0324254 | A1 | 12/2013 | Huang et al. |
| 2014/0018173 | A1 | 1/2014 | Urhman |
| 2014/0282051 | A1 | 9/2014 | Cruz-Hernandez et al. |
| 2015/0065090 | A1 | 3/2015 | Yeh |
| 2015/0100204 | A1 | 4/2015 | Gondo |
| 2015/0237183 | A1 | 8/2015 | Novet |
| 2016/0026216 | A1 | 1/2016 | Novet |
| 2016/0179338 | A1 | 6/2016 | Miller |
| 2016/0306422 | A1 | 10/2016 | Parham et al. |
| 2016/0357261 | A1 | 12/2016 | Bristol et al. |
| 2016/0361638 | A1 | 12/2016 | Higgins et al. |
| 2016/0363996 | A1 | 12/2016 | Higgins et al. |
| 2016/0364910 | A1 | 12/2016 | Higgins et al. |
| 2017/0003798 | A1 | 1/2017 | Peng et al. |
| 2017/0024007 | A1 | 1/2017 | Pelis et al. |
| 2017/0131767 | A1 | 5/2017 | Long |
| 2017/0151494 | A1 | 6/2017 | Ironmonger et al. |
| 2017/0329440 | A1 | 11/2017 | Sturm et al. |
| 2018/0004310 | A1 | 1/2018 | Drum |
| 2018/0067545 | A1* | 3/2018 | Provancher ............. G06F 3/011 |
| 2019/0308097 | A1* | 10/2019 | Yamano ................ G06F 3/0338 |

FOREIGN PATENT DOCUMENTS

| | | |
|---|---|---|
| JP | 2004-227266 A | 8/2004 |
| JP | 6117414 B1 | 4/2017 |
| WO | WO 2015/153690 A1 | 10/2015 |
| WO | WO 2016/140924 A1 | 9/2016 |

OTHER PUBLICATIONS

European Extended Search Report, European Application No. 17202772. 4, dated Jan. 26, 2018, 7 pages.
European Extended Search Report, European Application No. 17202777. 3, dated Mar. 15, 2018, 8 pages.
European Extended Search Report, European Application No. 18184661. 9, dated Feb. 12, 2019, 12 pages.
European Patent Office, Office Action, European Application No. 17202777.3, dated Feb. 18, 2020, 6 pages.
European Patent Office, Office Action, European Application No. 18184661.9, dated Apr. 28, 2020, 7 pages.
PCT International Search Report and Written Opinion, PCT Application No. PCT/US2018/012207, dated Sep. 13, 2018, 13 pages.
PCT International Search Report and Written Opinion, PCT Application No. PCT/US2017/037608, dated Jan. 25, 2018, 15 pages.
PCT International Search Report and Written Opinion, PCT Application No. PCT/US2017/031974, dated Jan. 2, 2018, 16 pages.
PCT International Search Report and Written Opinion, PCT Application No. PCT/US2017/037638, dated Nov. 27, 2017, 12 pages.
International Preliminary Report on Patentability for International Application No. PCT/US2018/012207, dated Jul. 9, 2020, 9 Pages.
Korean Intellectual Property Office, Office Action, Korean Patent Application No. 10-2019-7033840, dated Mar. 26, 2021, nine pages.

* cited by examiner

HAND-HELD CONTROLLER USING SENSORS FOR HAND DISAMBIGUATION

CROSS REFERENCE TO RELATED APPLICATIONS

This application is a division of U.S. application Ser. No. 15/858,416, filed Dec. 29, 2017, which is incorporated by reference in its entirety.

BACKGROUND

Field of the Disclosure

The present disclosure generally relates to artificial reality controllers, and specifically to a hand-held controller using sensors for hand disambiguation.

Description of the Related Arts

Artificial reality systems may include a controller to translate movement of the user's body into tangible action in a virtual world. Some controllers provide vibration feedback to Android or iOS artificial reality headsets for motion-based gaming. A controller may be equipped with a gyroscope, an accelerometer, or terrestrial magnetic field sensor to trace motion back to a game, allowing intuitive gameplay as if the player is within the game.

SUMMARY

Embodiments relate to a hand-held controller to track a user's hand motion, position, natural gestures, and finger movement to create a sense of hand presence for more realistic and tactile artificial reality. The controller may let the user make social gestures like point, wave, and give a thumbs-up or manipulate objects in the virtual space, pick up toys or fire laser guns with intuitive, natural hand movement.

In one embodiment, the hand-held controller includes a handle extending in a longitudinal direction. The handle is shaped and dimensioned to be grasped by a hand of a user. A ring is attached to an end of the handle and has an annular surface defining a plane that forms a predetermined angle with respect to the longitudinal direction. The ring also has a curved outer surface. An optical proximity sensor is embedded within the ring or the handle to detect whether the hand of the user grasping the handle is a right hand of the user or a left hand of the user.

In one embodiment, the optical proximity sensor emits light in a direction of the hand of the user grasping the handle.

In one embodiment, the light is infrared light.

In one embodiment, the optical proximity sensor includes a photodiode or phototransistor to receive reflected light from the hand of the user grasping the handle and generate sensor signals corresponding to the reflected light. The sensor signals indicate whether the hand of the user grasping the handle is the right hand of the user or the left hand of the user.

In one embodiment, the optical proximity sensor determines whether the hand of the user grasping the handle is the right hand of the user or the left hand of the user based on whether a time interval between the optical proximity sensor emitting light in a direction of the hand of the user grasping the handle and the optical proximity sensor receiving reflected light from the hand of the user grasping the handle is higher than a threshold time period.

In one embodiment, at least part of the ring or the handle is transparent to infrared light.

In one embodiment, at least part of the light emitted by the optical proximity sensor exits through the curved outer surface of the ring or a side surface of the handle.

In one embodiment, a hand-held controller includes a handle extending in a longitudinal direction. The handle is shaped and dimensioned to be grasped by a hand of a user. A ring is attached to an end of the handle and has an annular surface defining a plane that forms a predetermined angle with respect to the longitudinal direction and a curved outer surface. A first capacitive electrode is mounted on a first side surface of the handle and a second capacitive electrode is mounted on a second side surface of the handle opposite to the first side surface. The first capacitive electrode and the second capacitive electrode detect whether the hand of the user grasping the handle is a right hand of the user or a left hand of the user.

In one embodiment, the first capacitive electrode and the second capacitive electrode are contacted by the hand of the user grasping the handle.

In one embodiment, the first capacitive electrode determines a first capacitance between the handle and the hand of the user grasping the handle. The second capacitive electrode determines a second capacitance between the handle and the hand of the user grasping the handle.

In one embodiment, the first capacitive electrode generates first sensor signals corresponding to a first capacitance between the handle and the hand of the user grasping the handle. The second capacitive electrode generates second sensor signals corresponding to a second capacitance between the handle and the hand of the user grasping the handle.

In one embodiment, the first capacitance is a capacitance between the handle and a finger of the hand of the user grasping the handle. The second capacitance is a capacitance between the handle and a palm of the hand of the user grasping the handle.

In one embodiment, a sensor circuit coupled to the first capacitive electrode and the second capacitive electrode receives the first sensor signals from the first capacitive electrode. The sensor circuit receives the second sensor signals from the second capacitive electrode and determines whether the hand of the user grasping the handle is the right hand of the user or the left hand of the user based on whether the first sensor signals are stronger than the second sensor signals.

In one embodiment, a sensor circuit is coupled to the first capacitive electrode and the second capacitive electrode. The sensor circuit determines whether the hand of the user grasping the handle is the right hand of the user or the left hand of the user based on whether the first capacitance is higher than the second capacitance.

In one embodiment, a wireless communication interface transmits wireless signals indicating whether the hand of the user grasping the handle is a right hand of the user or a left hand of the user.

In one embodiment, a first capacitive electrode mounted on a first side surface of a handle of a hand-held controller determines a first capacitance between the handle and a hand of the user grasping the handle. A second capacitive electrode mounted on a second side surface of the handle determines a second capacitance between the handle and the hand of the user grasping the handle. It is determined whether the hand of the user grasping the handle is the right hand of the user or the left hand of the user based on whether the first capacitance is higher than the second capacitance.

In one embodiment, the first capacitive electrode generates first sensor signals corresponding to the first capacitance. The second capacitive electrode generates second sensor signals corresponding to the second capacitance.

In one embodiment, the determining of whether the hand of the user grasping the handle is the right hand of the user or the left hand of the user includes determining whether the first sensor signals are stronger than the second sensor signals.

In one embodiment, the first capacitance is a capacitance between the handle and a finger of the hand of the user grasping the handle.

In one embodiment, the second capacitance is a capacitance between the handle and a palm of the hand of the user grasping the handle.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Embodiments relate to a hand-held artificial reality controller to track a user's hand motion and position. The hand-held controller includes a handle extending in a longitudinal direction. A ring is attached to an end of the handle and has a curved outer surface. A sensor embedded within the ring or mounted on the handle detects whether the hand of the user grasping the handle is a right hand of the user or a left hand of the user.

Figure 1A:
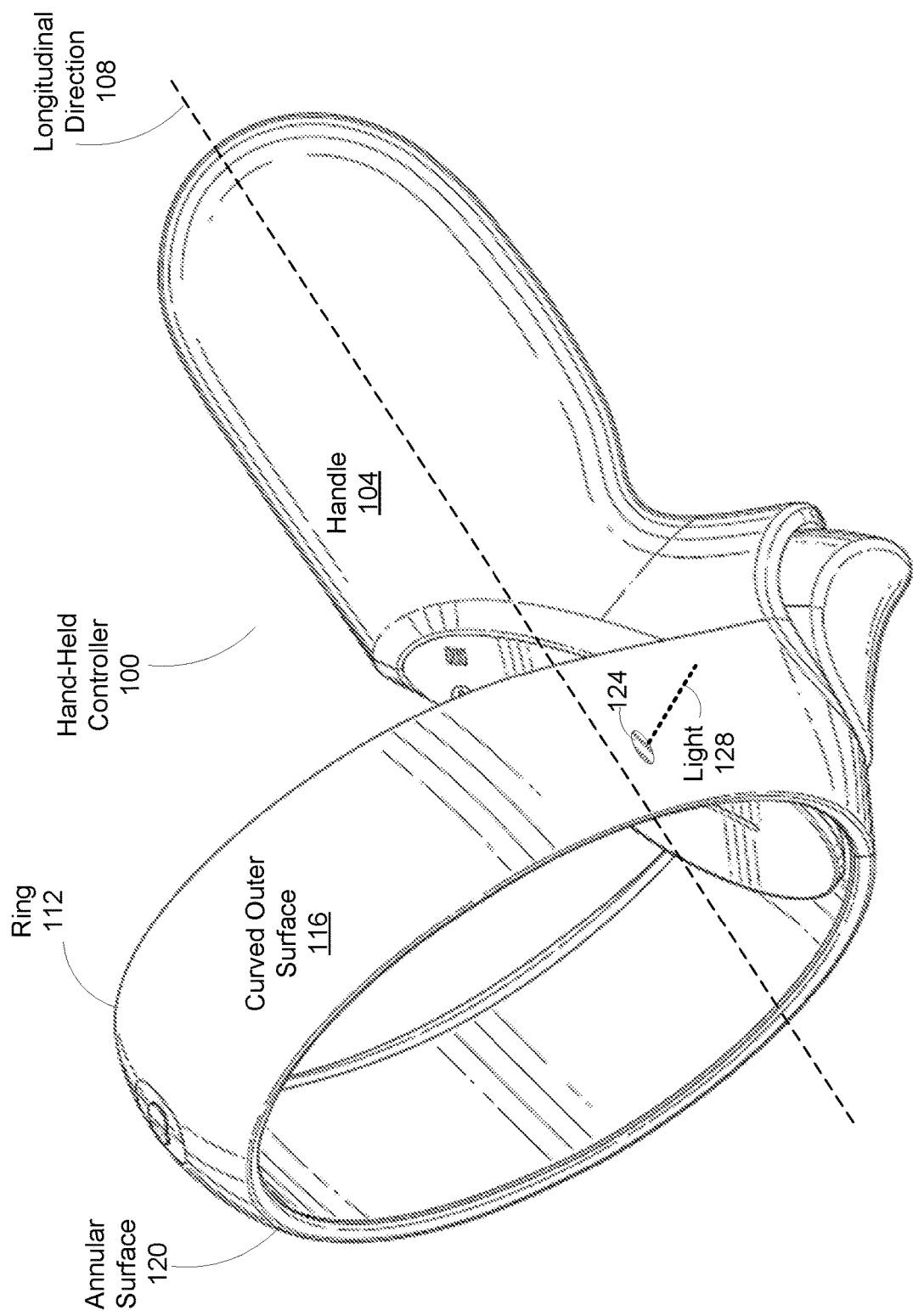
FIG. 1A is an example schematic perspective view of a hand-held controller including an optical proximity sensor, in accordance with an embodiment.

Example Schematic Perspective View of Hand-Held Controller With Optical Proximity Sensor FIG. 1A is an example schematic perspective view of a hand-held controller 100 including an optical proximity sensor 124, in accordance with an embodiment. The hand-held controller 100 may be included in an artificial reality system as a stand-alone controller or as part of a pair of tracked controllers that give a user "hand presence"—the feeling that the user's virtual hands are actually his own. The hand-held controller 100 may enable the user to manipulate objects in a virtual space with precision and intuitive, natural hand movement.

The hand-held controller 100 includes a handle 104 extending in a longitudinal direction 108. In one embodiment, the handle 104 may be made of an engineering plastic, such as injection-molded polycarbonate (PC)/acrylonitrile butadiene styrene (ABS) or polyamide (nylon). In other embodiments, the handle 104 may be made of wood or metal. The handle 104 may be resistant to impact and abrasion. The material of the handle 104 may exhibit heat resistance, mechanical strength, or rigidity.

The handle 104 is shaped and dimensioned to be grasped by a user's hand for tracking natural gestures and finger movements to create more realistic and tactile artificial reality. For example, the handle may have a cylindrical shape. The handle 104 of the hand-held controller 100 may bend or curve to balance the weight of the controller 100, such that it rests naturally in the top of the palm of the user or the crook of the user's fingers. The user may therefore comfortably hold the hand-held controller 100 without dropping it. Even if the user tries to open his hand completely when holding the hand-held controller 100 normally, the user's fingers may catch on the ring 112 and support the hand-held controller 100's weight. The ring 112 is attached to an end of the handle 104 and has an annular surface 120. The ring may be made of engineering plastic. In one embodiment, the ring is made of infrared-transparent polycarbonate. The ring 112 may surround a thumb of the user when the handle 104 is grasped by the user's hand.

The ring 112 has a curved outer surface 116, as illustrated in FIG. 1. In one embodiment, an optical proximity sensor 124 is embedded within the ring 112 to detect whether a hand of the user grasping the handle 104 is a right hand of the user or a left hand of the user. Information about which hand is grasping the controller may be transmitted to an artificial reality system for tracking a position or orientation of the user in a computer game or training simulation. Based on which hand is grasping the controller, the artificial reality system may alter the present state of the game or future artificial reality events.

A proximity sensor is a sensor able to detect the presence of nearby objects without any physical contact. An optical proximity sensor uses emission and reflection of light to detect the presence of nearby objects. For example, the optical proximity sensor 124 may be a photocell (reflective) type sensor, a laser rangefinder, a passive sensor (e.g., charge-coupled devices), some other sensor that uses light reflection, a passive thermal infrared sensor, or a combination thereof. The optical proximity sensor 124 emits light 128 in a direction of the hand of the user grasping the handle 104, e.g., to determine a distance between the hand and the optical proximity sensor 124. In one embodiment, the light 128is infrared light. Infrared light is electromagnetic radiation with longer wavelengths than those of visible light, and is therefore invisible.

In one embodiment, the optical proximity sensor 124 includes a photodiode or phototransistor to receive reflected light from the hand of the user grasping the handle 104. A photodiode is a semiconductor device that converts light into an electrical current or voltage when photons from the reflect light are absorbed in the photodiode. A phototransistor is a light-sensitive transistor, e.g., a photobipolar transistor, which is a bipolar transistor encased in a transparent case so that light can reach the base-collector junction.

In one embodiment, the optical proximity sensor 124 determines whether the hand of the user grasping the handle 104 is the right hand of the user or the left hand of the user based on a distance between the hand and the optical proximity sensor 124. For example, if the optical proximity sensor 124 is embedded on the left hand side of the ring 112 (as shown in FIG. 1A) and the hand of the user grasping the handle 104 is the left hand, the optical proximity sensor 124 may measure the distance between the optical proximity sensor 124 and the left hand of the user as a finite distance (indicating that the hand of the user grasping the handle is the left hand). On the other hand, if the optical proximity sensor 124 is embedded on the left hand side of the ring 112 as shown in FIG. 1A and the hand of the user grasping the handle 104 is the right hand, the hand will not be in line of sight of the optical proximity sensor 124. Therefore the light 128 will not reach the right hand of the user and the light 128 from the optical proximity sensor 124 will not reflect back to the optical proximity sensor 124, leading to a measurement of "infinite" distance (indicating that the hand of the user grasping the handle is the right hand)

Similarly, if the optical proximity sensor 124 is embedded on the right hand side of the ring 112 (not shown in FIG. 1A) and the hand of the user grasping the handle 104 is the right hand, the optical proximity sensor 124 may measure the distance between the optical proximity sensor 124 and the right hand of the user as a finite distance (indicating that the hand of the user grasping the handle is the right hand). On the other hand, if the optical proximity sensor 124 is embedded on the right hand side of the ring 112 and the hand of the user grasping the handle 104 is the left hand, the hand will not be in line of sight of the optical proximity sensor 124. Therefore the light 128 will not reach the hand of the user and the light 128 from the optical proximity sensor 124 will not reflect back to the optical proximity sensor 124, leading to a measurement of "infinite" distance (indicating that the hand of the user grasping the handle is the left hand).

In one embodiment, the optical proximity sensor 124 determines whether the hand of the user grasping the handle 104 is the right hand of the user or the left hand of the user based on whether a time interval between the optical proximity sensor 124 emitting light 128 in a direction of the hand of the user grasping the handle 104 and the optical proximity sensor 124 receiving reflected light from the hand of the user grasping the handle 104 is higher than a threshold time period. For example, if the optical proximity sensor 124 is embedded on the left hand side of the ring 112 (as shown in FIG. 1A), the hand of the user grasping the handle 104 is the left hand, and the optical proximity sensor 124 emits light 128 in a direction of the left hand of the user at time t1, the light 128 may travel to the left hand and reflect back off the left hand towards the optical proximity sensor 124 and reach the optical proximity sensor at time t2. The optical proximity sensor 124 may measure the time interval t2–t1 as a finite time interval (indicating that the hand of the user grasping the handle is the left hand). On the other hand, if the optical proximity sensor 124 is embedded on the left hand side of the ring 112 (as shown in FIG. 1A) and the hand of the user grasping the handle 104 is the right hand, the hand will not be in line of sight of the optical proximity sensor 124. Therefore the light 128 will not reach the right hand of the user and the light 128 from the optical proximity sensor 124 will not reflect back to the optical proximity sensor 124, leading to a measurement of "infinite" time interval (indicating that the hand of the user grasping the handle is the right hand).

Similarly, if the optical proximity sensor 124 is embedded on the right hand side of the ring 112 (not shown in FIG. 1A), the hand of the user grasping the handle 104 is the right hand, and the optical proximity sensor 124 emits light 128 in a direction of the right hand of the user at time t1, the light 128 may travel to the right hand and reflect back off the right hand towards the optical proximity sensor 124 and reach the optical proximity sensor at time t2. The optical proximity sensor 124 may measure the time interval t2–t1 as a finite time interval (indicating that the hand of the user grasping the handle is the right hand). On the other hand, if the optical proximity sensor 124 is embedded on the right hand side of the ring 112 and the hand of the user grasping the handle 104 is the left hand, the hand will not be in line of sight of the optical proximity sensor 124. Therefore the light 128 will not reach the left hand of the user and the light 128 from the optical proximity sensor 124 will not reflect back to the optical proximity sensor 124, leading to a measurement of "infinite" time interval (indicating that the hand of the user grasping the handle is the left hand).

In this manner, the optical proximity sensor may enable the hand-held controller 100 to determine which hand of the user is grasping the handle 104.

Example Cross Sectional View of a Ring of Hand-Held Controller

Figure 1B:
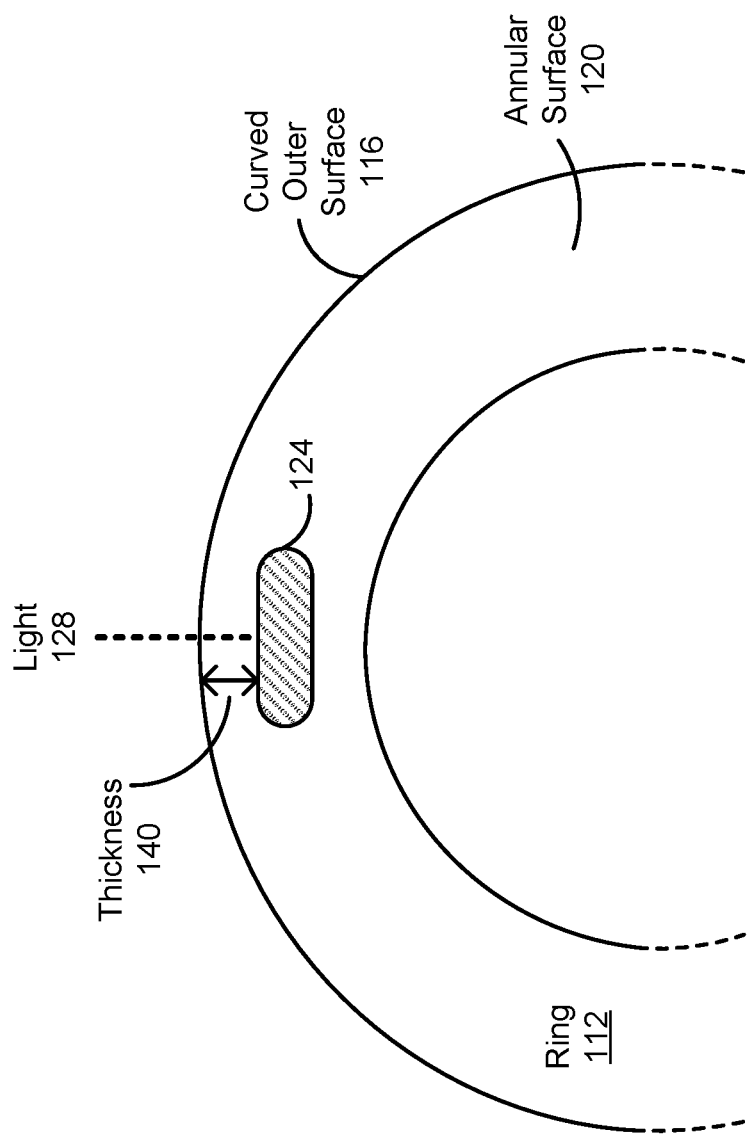
FIG. 1B is an example cross sectional view of a ring of a hand-held controller including an optical proximity sensor, in accordance with an embodiment.

FIG. 1B is an example cross sectional view of the ring 112 of the hand-held controller 100 including the embedded optical proximity sensor 124, in accordance with an embodiment. As described above with respect to FIG. 1A, in FIG. 1B the ring 112 has an annular surface 120 and a curved outer surface 116. The optical proximity sensor 124 is embedded within the ring 112 to detect whether a hand of the user grasping the handle 104 is a right hand of the user or a left hand of the user.

The optical proximity sensor 124 may be embedded and positioned within the ring 112 in such a manner that the light 128 emitted by the optical proximity sensor 124 exits the ring 12 in a direction of a hand of the user grasping the handle 104. In one embodiment, the light 128 emitted by the optical proximity sensor 124 is infrared light and at least part of the ring 112 is transparent to infrared light to allow the light 128 to exit the ring 112 in a direction of the hand of the user grasping the handle 104. For example, the ring may be made of infrared transmitting plastic, infrared-transparent Poly(methyl methacrylate) (PMMA), also known as acrylic or acrylic glass, infrared-transparent polycarbonate, some other material transparent to infrared light, or a combination thereof. At least part of the light 128 emitted by the optical proximity sensor 124 exits through the curved outer surface 116 of the ring 112.

A thickness 140 of the ring 112 between the optical proximity sensor 124 and the curved outer surface 116 may be designed to allow the light 128 to exit through the curved outer surface 116 of the ring 112. For example, the thickness of the material of the ring 112 may be reduced where the material surrounds the optical proximity sensor 124, such that it is easier for the light 128 emitted by the optical proximity sensor 124 to exit through the curved outer surface 116 of the ring 112.

Figure 1C:
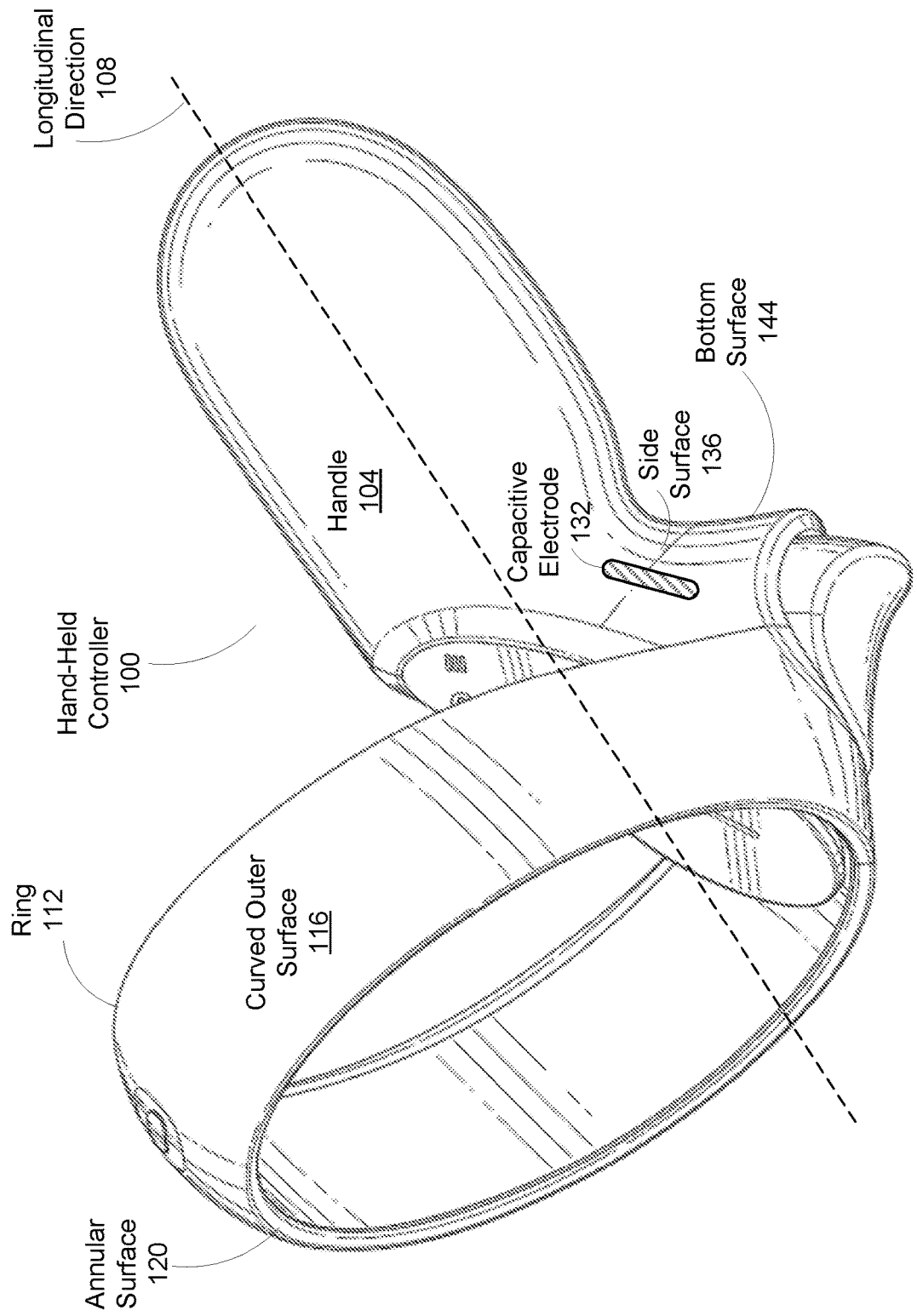
FIG. 1C is an example schematic perspective view of the hand-held controller including a capacitive electrode, in accordance with an embodiment.

Example Schematic Perspective View of Hand-Held Controller Including Capacitive Electrode FIG. 1C is an example schematic perspective view of a hand-held controller 100 including a capacitive electrode 132, in accordance with an embodiment. As shown earlier in FIG. 1A, the hand-held controller 100 includes a handle 104 extending in a longitudinal direction 108. A ring 112 is attached to an end of the handle 104 and has an annular surface 120 and a curved outer surface 116.

The hand-held controller 100 includes a first capacitive electrode 132 mounted on a first side surface 136 of the handle as shown in FIG. 1C. The first capacitive electrode 132 uses capacitive sensing based on capacitive coupling between the handle 104 and the hand of the user grasping the handle 104 to detect a first capacitance between the hand of the user and the handle 104. The first capacitive electrode 132 may be made of copper, Indium tin oxide (ITO), printed ink, some other media, or a combination thereof. The size of the first capacitive electrode 132 and its spacing relative to the ground plane may be designed to improve the electrode's performance in sensing the capacitance between the user's hand and the handle 104.

In one embodiment, the side surface 136 is coated with conductive material to form the first capacitive electrode 132. In one embodiment, the first capacitive electrode 132 may be etched to form a grid pattern of electrodes. A voltage is applied to the first capacitive electrode 132. When a conductor, such as a human finger or palm, touches the first capacitive electrode 132, the capacitance between the finger or palm and the electrode is dynamically changed. The hand-held controller 100 can thus determine the capacitance using, in one embodiment, a sensor circuit coupled to the capacitive electrode, as described below with reference to FIG. 3B.

A second capacitive electrode (not shown in FIG. 1C) is mounted on a second side surface of the handle opposite to the first side surface 136. The first capacitive electrode 132 and the second capacitive electrode detect whether the hand of the user grasping the handle 104 is a right hand of the user or a left hand of the user, as described in detail below with reference to FIG. 2C.

The handle 104 of the hand-held controller 100 includes a bottom surface 144. If the hand of the user grasping the handle 104 is a right hand, the palm of the right hand will contact the second capacitive electrode (not shown in FIG. 1C). The fingers of the user will wrap around the bottom surface 144 of the handle 104 and contact the first capacitive electrode 132. On the other hand, if the hand of the user grasping the handle 104 is a left hand, the palm of the left hand will contact the first capacitive electrode 132. The fingers of the user will wrap around the bottom surface 144 of the handle 104 and contact the second capacitive electrode.

Figure 2A:
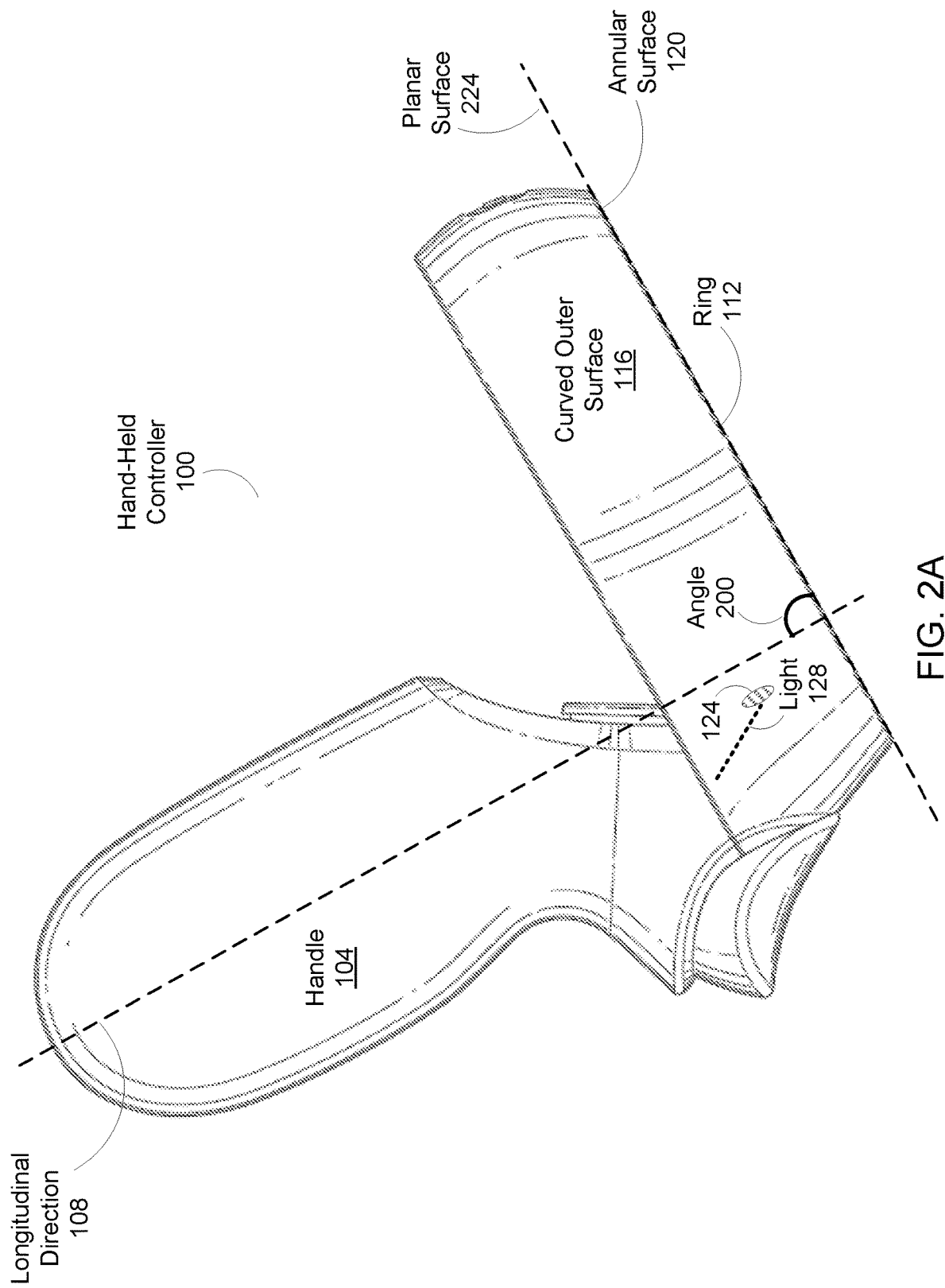
FIG. 2A is an example schematic side view of the hand-held controller including an optical proximity sensor, in accordance with an embodiment.

Example Schematic Side View of Hand-Held Controller Including Optical Proximity Sensor FIG. 2A is an example schematic side view of a hand-held controller 100 including an optical proximity sensor 124, in accordance with an embodiment. The annular surface 120 of the ring 112, illustrated and described above with reference to FIG. 1A, defines a planar surface 224 that forms a predetermined angle 200 with respect to the longitudinal direction 108 in which the handle 104 extends. For example, the predetermined angle 200 may be between 45° to 135°. With the ring geometry illustrated in FIG. 2A, if the predetermined angle 200 is more than 45°, this avoids interference with the thumb movement of the user. If the predetermined angle 200 is less than 135°, this avoids any affects to the inside-out tracking visibility to a camera mounted on an HMD.

As described above with respect to FIG. 1A, in one embodiment, an optical proximity sensor 124 is embedded within the ring 112 to detect whether a hand of the user grasping the handle 104 is a right hand of the user or a left hand of the user. The optical proximity sensor 124 emits light 128 in a direction of the hand of the user grasping the handle 104 to sense the user's hand.

Figure 2B:
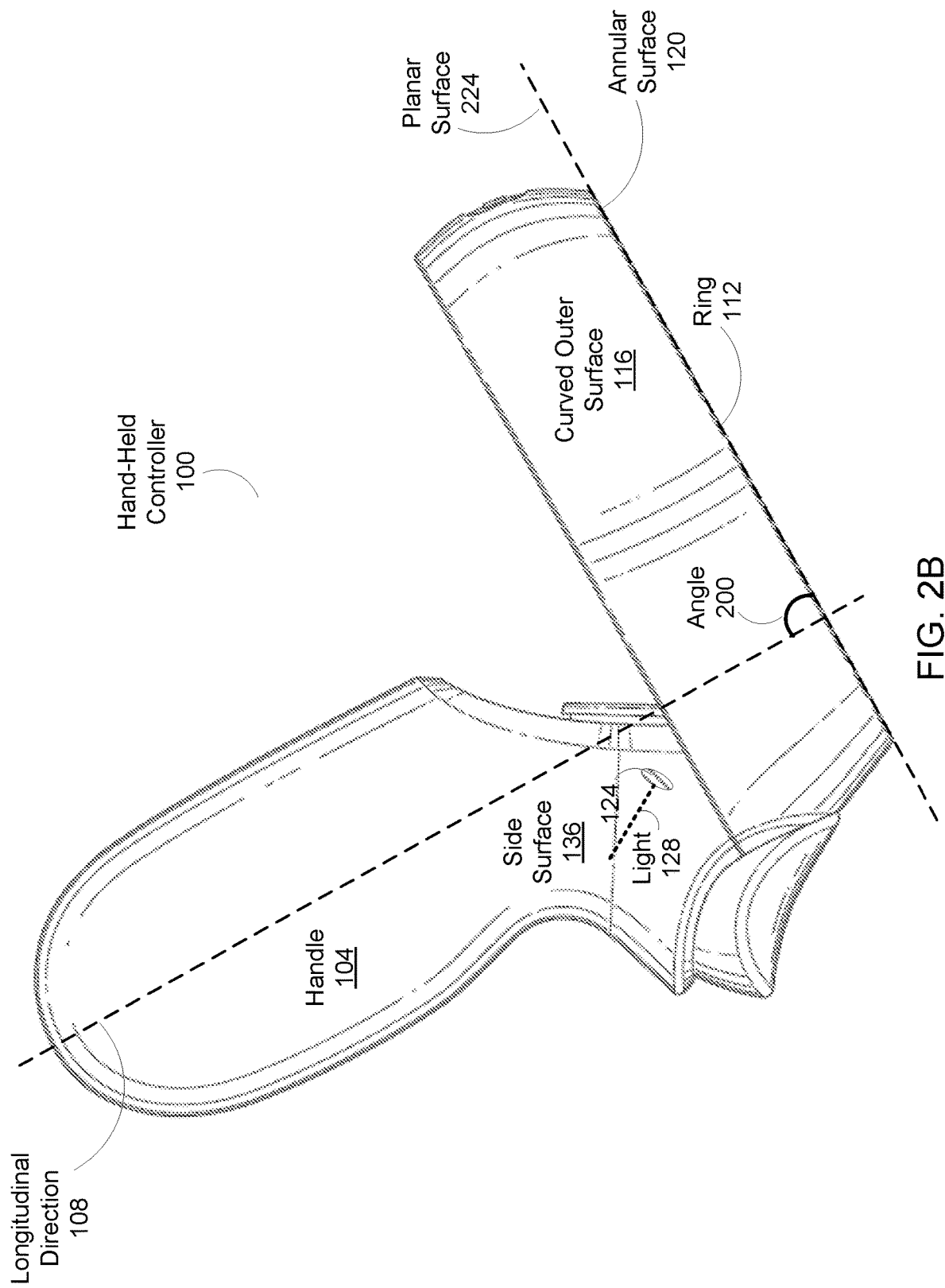
FIG. 2B is an example schematic side view of the hand-held controller including an optical proximity sensor, in accordance with an embodiment.

Example Schematic Side View of Hand-Held Controller Including Optical Proximity Sensor FIG. 2B is an example schematic side view of a hand-held controller 100 including an optical proximity sensor 124, in accordance with an embodiment. The annular surface 120 of the ring 112, illustrated and described above with reference to FIG. 1A, defines a planar surface 224 that forms a predetermined angle 200 with respect to the longitudinal direction 108 in which the handle 104 extends.

In one embodiment, an optical proximity sensor 124 is embedded within the handle 104 to detect whether a hand of the user grasping the handle 104 is a right hand of the user or a left hand of the user. The optical proximity sensor 124 emits light 128 in a direction of the hand of the user grasping the handle 104 to sense the user's hand.

The optical proximity sensor 124 determines whether the hand of the user grasping the handle 104 is the right hand of the user or the left hand of the user based on a distance between the hand and the optical proximity sensor 124. For example, if the optical proximity sensor 124 is embedded on the right hand side of the handle 104 (as shown in FIG. 2B) and the hand of the user grasping the handle 104 is the right hand, the optical proximity sensor 124 may measure the distance between the optical proximity sensor 124 and a portion of the right hand closer to the thumb (indicating that the hand is the right hand). On the other hand, if the hand of the user grasping the handle 104 is the left hand, the optical proximity sensor 124 may measure the distance between the optical proximity sensor 124 and a portion of the right hand closer to the little finger (indicating that the hand is the left hand). Similarly, distance measurements by the optical proximity sensor 124 placed on the opposite side surface (not shown in FIG. 2B) may indicate whether the hand gripping the handle 104 is a right hand or a left hand.

Figure 2C:
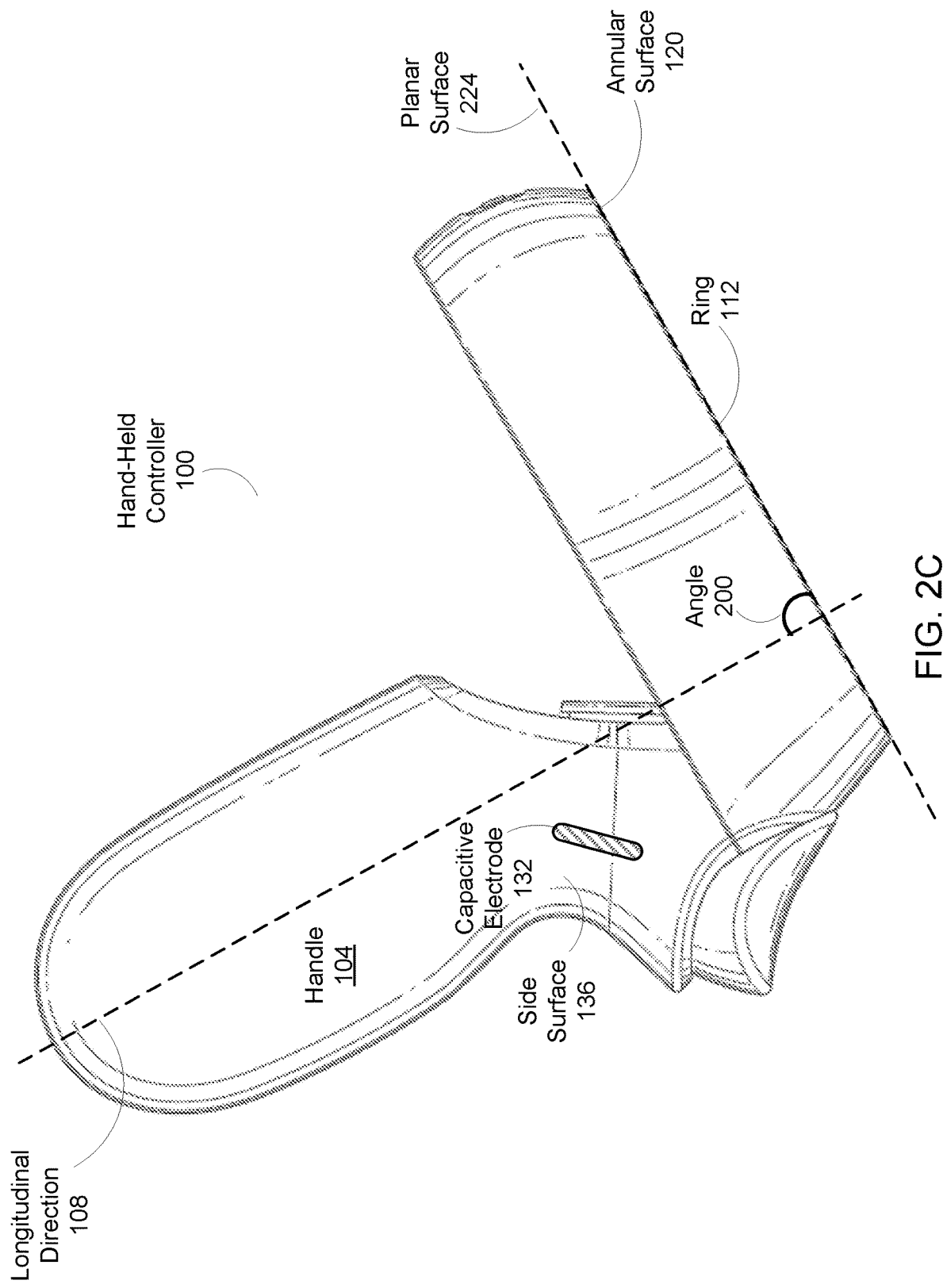
FIG. 2C is an example schematic side view of the hand-held controller including a capacitive electrode, in accordance with an embodiment.

Example Schematic Side View of Hand-Held Controller Including Capacitive Electrode FIG. 2C is an example schematic side view of a hand-held controller 100 including a first capacitive electrode 132, in accordance with an embodiment. As described above with respect to FIG. 2A, the annular surface 120 of the ring 112 defines a planar surface 224 that forms a predetermined angle 200 with respect to the longitudinal direction 108 in which the handle 104 extends. As described above with respect to FIG. 1C, the hand-held controller 100 includes a first capacitive electrode 132 mounted on a first side surface 136 of the handle 104. The first capacitive electrode 132 uses capacitive sensing based on capacitive coupling between the handle 104 and the hand of the user grasping the handle 104 to detect a first capacitance between the hand of the user and the handle 104.

A second capacitive electrode (not shown in FIG. 2C) is mounted on a second side surface of the handle opposite to the first side surface 136. The first capacitive electrode 132 and the second capacitive electrode detect whether the hand of the user grasping the handle 104 is a right hand of the user or a left hand of the user, as described in detail below with reference to FIG. 2D.

Figure 2D:
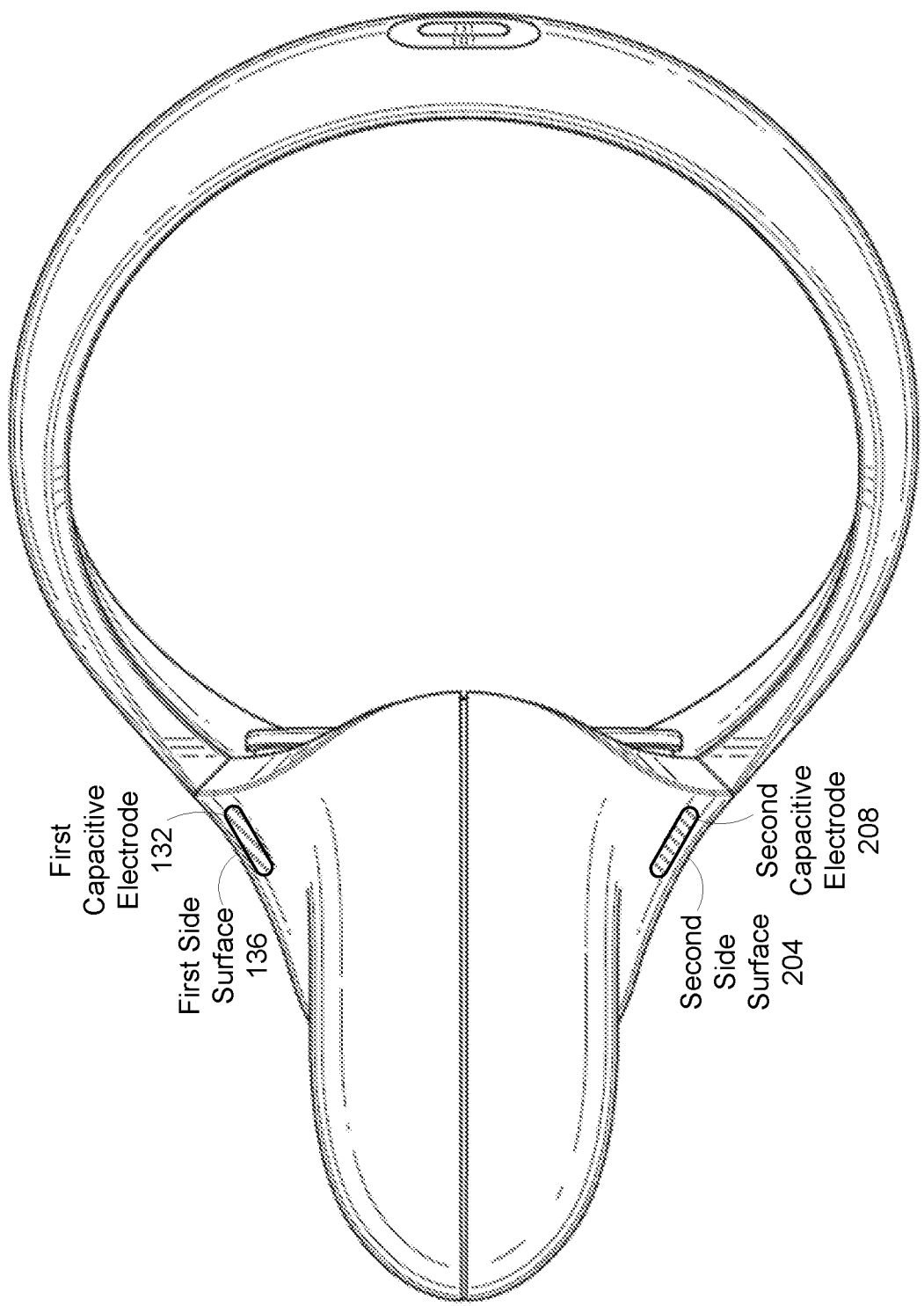
FIG. 2D is an example schematic planar view of the hand-held controller including a first capacitive electrode and a second capacitive electrode, in accordance with an embodiment.

Example Schematic Planar View of Hand-Held Controller Including Capacitive Electrodes FIG. 2D is an example schematic planar view of a hand-held controller 100 including capacitive electrodes 132 and 208, in accordance with an embodiment. The hand-held controller 100 includes a first capacitive electrode 132 mounted on a first side surface 136 of the handle 104 and a second capacitive electrode 208 mounted on a second side surface 204 of the handle 104 opposite to the first side surface 136. The first capacitive electrode 132 and the second capacitive electrode 208 detect whether the hand of the user grasping the handle 104 is a right hand of the user or a left hand of the user.

The first capacitive electrode 132 determines a first capacitance between the handle 104 and the hand of the user grasping the handle 104, as described above with respect to FIG. 1C. The second capacitive electrode 208 determines a second capacitance between the handle 104 and the hand of the user grasping the handle 104. For example, if the hand of the user grasping the handle 104 is a right hand, the palm of the right hand will contact the second capacitive electrode 208. The fingers of the user will wrap around a bottom surface 144 of the handle 104 and contact the first capacitive electrode 132. In this example, therefore, the first capacitance will be a capacitance between the handle 104 and a finger of the hand of the user grasping the handle 104. The second capacitance will be a capacitance between the handle 104 and a palm of the hand of the user grasping the handle 104. The first capacitance 132 will be less than the second capacitance because the user's fingers have less surface area than the user's palm. The hand-held controller 100 can thus determine that the hand of the user grasping the handle 104 is a right hand because the first capacitance 132 is less than the second capacitance.

On the other hand, if the hand of the user grasping the handle 104 is a left hand, the palm of the left hand will contact the first capacitive electrode 132. The fingers of the user will wrap around a bottom surface 144 of the handle 104 and contact the second capacitive electrode 208. In this example, therefore, the second capacitance will be a capacitance between the handle 104 and a finger of the hand of the user grasping the handle 104. The first capacitance will be a capacitance between the handle 104 and a palm of the hand of the user grasping the handle 104. The first capacitance 132 will be greater than the second capacitance because the user's fingers have less surface area than the user's palm. The hand-held controller 100 can thus determine that the hand of the user grasping the handle 104 is a left hand because the first capacitance 132 is greater than the second capacitance.

Figure 3A:
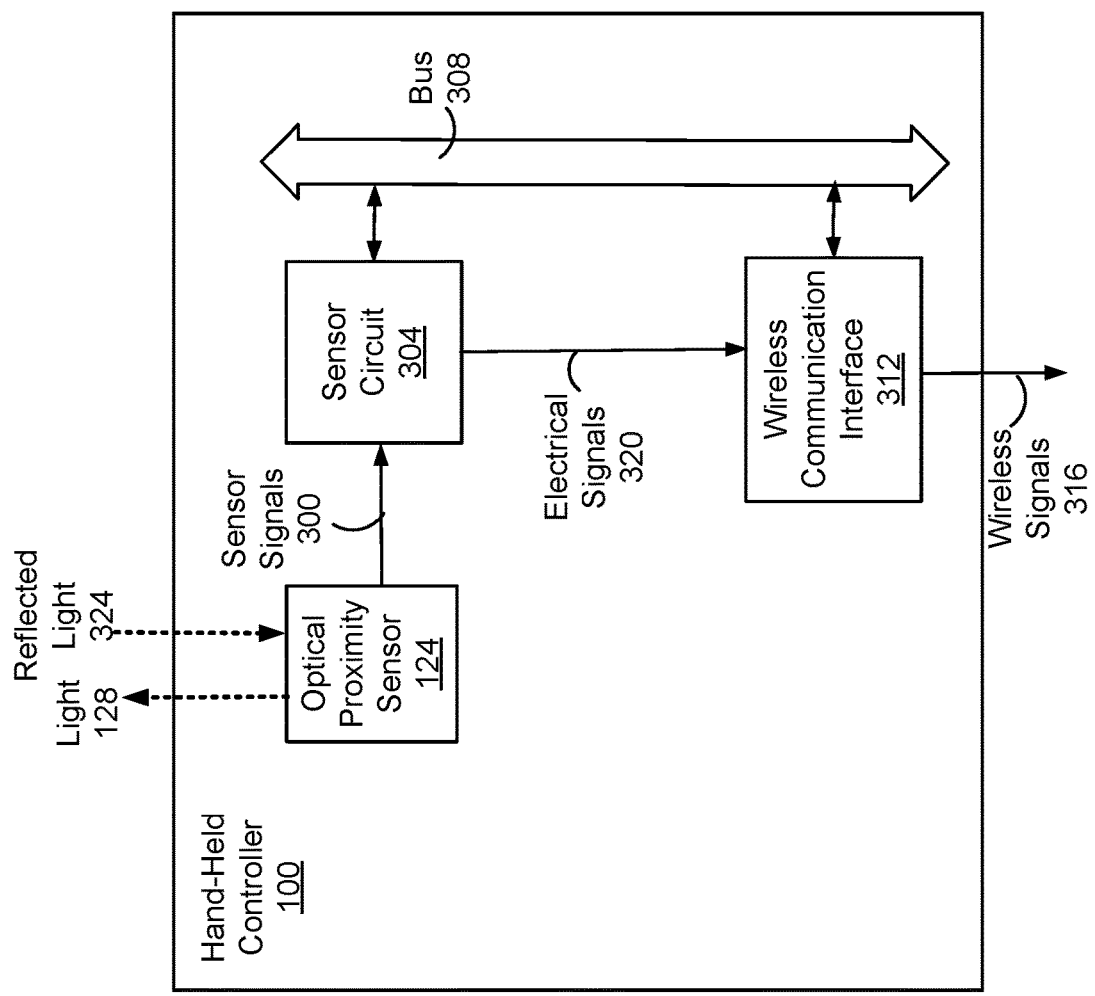
FIG. 3A is an example schematic block diagram of the hand-held controller including an optical proximity sensor, in accordance with an embodiment.

Example Schematic Block Diagram of Hand-Held Controller With Optical Proximity Sensor FIG. 3A is an example schematic block diagram of a hand-held controller 100 including an optical proximity sensor 124, in accordance with an embodiment. The block diagram includes the optical proximity sensor 124, a sensor circuit 304, a wireless communication interface 312, and a bus 308. In alternative configurations, different and/or additional components may be included in the hand-held controller 100, such as a memory, central processing unit, battery, Bluetooth component, USB input, etc.

The optical proximity sensor 124 emits light 128 in a direction of a hand of a user grasping a handle (e.g., 104) of the hand-held controller 100. The optical proximity sensor 124 includes a photodiode or phototransistor to receive reflected light 324 from the hand of the user grasping the handle 104 to determine which hand of the user is grasping the handle 104, as described in detail above with respect to FIG. 2C. The optical proximity sensor 124 generates sensor signals 300 corresponding to the reflected light 324. The sensor signals 300 indicate whether the hand of the user grasping the handle 104 is the right hand of the user or the left hand of the user.

The sensor circuit 304 is a digital, analog, or mixed-signal circuit to receive sensor signals 300 in the form of voltage or current from the optical proximity sensor 124. Based on the sensor signals 300, the sensor circuit 304 may determine which hand of the user is grasping the handle 104. The hand-held controller 100 may include a circuit to provide electrical signals, such as voltage, to the sensor circuit 304 and the optical proximity sensor 124. The sensor circuit 304 may be powered by a battery on the hand-held controller 100 to generate the electrical signals. The optical proximity sensor 124 may emit the light 128 responsive to receiving the electrical signals.

The hand-held controller 100 also includes the wireless communication interface 312, which may be a digital, analog, or mixed-signal circuit, to transmit wireless signals 316 indicating whether the hand of the user grasping the handle 104 is a right hand of the user or a left hand of the user. The wireless signals 316 may be transmitted to a head-mounted display, a computer, an artificial reality system, etc. The wireless communication interface 312 may send and receive data via a wireless network without the need for connecting cables to the hand-held controller 100. In one embodiment, the wireless communication interface 312 may support the USB 1.1 and 802.11b wireless network standards up to 11 Mbps data transfer rates. In one embodiment, the wireless communication interface 312 may support the USB 2.0 and 802.11g standards up to 54 Mpbs data transfer rates. In one embodiment, the wireless communication interface 312 may be a Compact Flash (CF) wireless network adapter using infrared technology for data exchanges between the hand-held controller 100 and a computer, etc. The wireless communication interface 312 and the sensor circuit 304 may communicate via the bus 308.

Figure 3B:
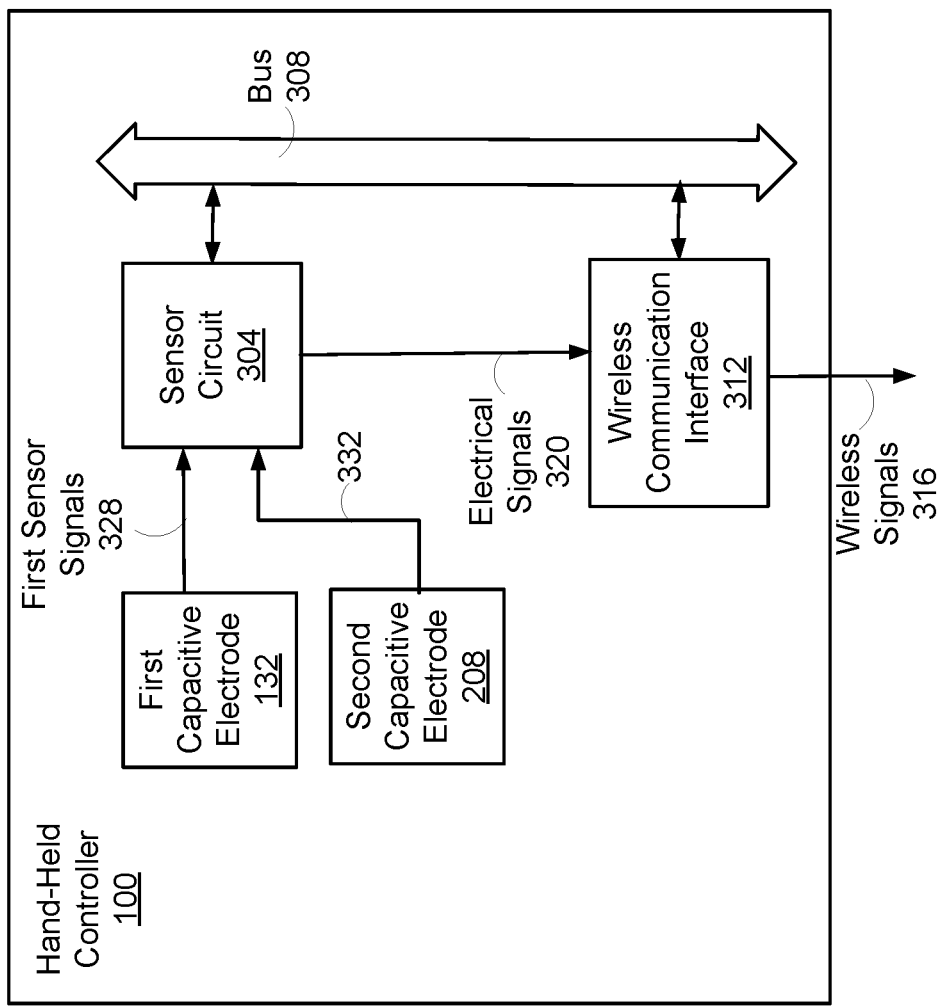
FIG. 3B is an example schematic block diagram of the hand-held controller including capacitive electrodes, in accordance with an embodiment.

Example Schematic Block Diagram of Hand-Held Controller with Capacitive Electrodes FIG. 3B is an example schematic block diagram of a hand-held controller 100 including capacitive electrodes 132 and 208, in accordance with an embodiment. The block diagram includes the first capacitive electrode 132, the second capacitive electrode 208, a sensor circuit 304, and a wireless communication interface 312. In alternative configurations, different and/or additional components may be included in the hand-held controller 100, such as a memory, central processing unit, battery, Bluetooth component, USB input, etc.

The first capacitive electrode 132 generates first sensor signals 328 corresponding to a first capacitance between the handle 104 and the hand of the user grasping the handle 104. For example, the first capacitive electrode 132 may be in an inactive state when the intended conductive object (hand of the user) is not nearby. The first capacitive electrode 132 may be in an active state when the intended conductive object (hand of the user) is within the desired activation range. The sensor signals 328, generated by the first capacitive electrode 132, may be a function of current or voltage vs time. For example, a distinct rise in the sensor signals 328 waveform measured by the sensor circuit 304 may indicate the presence of the user's hand touching or near the first capacitive electrode 132.

Similarly, the second capacitive electrode 208 generates second sensor signals 332 corresponding to a second capacitance between the handle 104 and the hand of the user grasping the handle 104.

The sensor circuit 308 is coupled to the first capacitive electrode 132 and the second capacitive electrode 208 to receive the first sensor signals 328 from the first capacitive electrode 132 and receive the second sensor signals 332 from the second capacitive electrode 208. The sensor circuit 308 determines whether the hand of the user grasping the handle 104 is the right hand of the user or the left hand of the user based on whether the first sensor signals 328 are stronger than the second sensor signals 332. For example if a voltage value of the first sensor signals 328 is higher than a voltage value of the second sensor signals 332, it may indicate that the hand of the user grasping the handle 104 is the right hand. In another example, the sensor circuit 308 may determine that a difference between the first sensor signals 328 and the second sensor signals 332 is higher than a threshold value, indicating a change in parametric state crossed by the first sensor signals 328 and the second sensor signals 332. The change in parametric state may indicate that the hand of the user grasping the handle 104 is the right hand.

In one embodiment, the sensor circuit 304 determines whether the hand of the user grasping the handle 104 is the right hand of the user or the left hand of the user based on whether the first capacitance is higher than the second capacitance. This may be implemented, for example, if the capacitive electrodes include circuitry to determine which part (palm or fingers) of the user is touching the electrodes based on the measured capacitances and inform the sensor circuit 304 accordingly. For example, if the first capacitance is higher than the second capacitance, it may indicate that the hand of the user grasping the handle 104 is the right hand.

The hand-held controller 100 may include a circuit to provide electrical signals, such as voltage, to the first capacitive electrode 132, the second capacitive electrode 208, and the sensor circuit 304. The sensor circuit 304 may be powered by a battery on the hand-held controller 100 to generate the electrical signals.

As described above with respect to FIG. 3A, the hand-held controller 100 may include a wireless communication interface 312 to transmit wireless signals 316 indicating whether the hand of the user grasping the handle 104 is a right hand of the user or a left hand of the user.

Example Process to Determine which Hand of the User is Grasping a Controller

Figure 4:
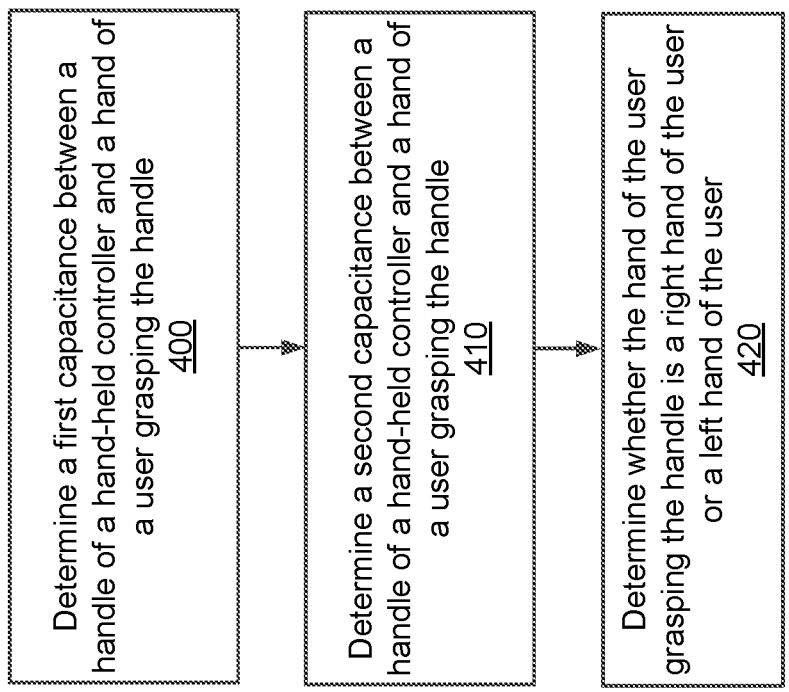
FIG. 4 is a flowchart illustrating an example process for determining whether a hand of a user grasping a hand-held controller is a right hand of the user or a left hand of the user, in accordance with an embodiment.

FIG. 4 is a flowchart illustrating an example process for determining whether a hand of a user grasping a hand-held controller is a right hand of the user or a left hand of the user, in accordance with an embodiment.

A first capacitive electrode 132, mounted on a first side surface 136 of a handle 104 of a hand-held controller 100, determines 400 a first capacitance between the handle 104 and a hand of the user grasping the handle 104, as described above with reference to FIGS. 1C, 2B, 2C, and 3B.

A second capacitive electrode 208, mounted on a second side surface 204 of the handle 104, determines 410 a second capacitance between the handle 104 and the hand of the user grasping the handle 104, as described above with reference to FIGS. 1C, 2B, 2C, and 3B.

The hand-held controller 100 determines 420 whether the hand of the user grasping the handle 104 is the right hand of the user or the left hand of the user based on whether the first capacitance is higher than the second capacitance. For example, the first capacitive electrode 132 may generate first sensor signals 328 corresponding to the first capacitance. The second capacitive electrode 208 may generate second sensor signals 332 corresponding to the second capacitance. The determining of whether the hand of the user grasping the handle 104 is the right hand of the user or the left hand of the user may include determining whether the first sensor signals 328 are stronger than the second sensor signals 332. For example if a voltage value of the first sensor signals 328 is higher than a voltage value of the second sensor signals 332, it may indicate that the hand of the user grasping the handle 104 is the right hand.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:
1. A hand-held controller, comprising:
a handle extending in a longitudinal direction, the handle shaped and dimensioned to be grasped by a hand of a user; and an optical proximity sensor mounted on a left side surface of the handle and configured to detect whether the hand of the user grasping the handle is a right hand of the user or a left hand of the user, detecting whether the hand is the right hand or the left hand comprises:
  determining a time interval between the optical proximity sensor emitting light and the optical proximity sensor receiving reflected light from the hand;
  determining whether the time interval is higher than a threshold; and
  determining, responsive to the time interval being higher than the threshold, that the hand is the right hand and, responsive to the time interval being lower than the threshold, that the hand is the left hand.

2. The hand-held controller of claim 1, wherein the optical proximity sensor is configured to emit light in a direction of the hand of the user grasping the handle.

3. The hand-held controller of claim 2, wherein the light is infrared light.

4. The hand-held controller of claim 1, wherein the optical proximity sensor comprises a photodiode or phototransistor configured to receive reflected light from the hand of the user grasping the handle and generate sensor signals corresponding to the reflected light, the sensor signals indicating whether the hand of the user grasping the handle is the right hand of the user or the left hand of the user.

5. The hand-held controller of claim 1, wherein at least part of the handle is transparent to infrared light.

6. The hand-held controller of claim 1, wherein at least part of the light emitted by the optical proximity sensor exits through a side surface of the handle.

7. The hand-held controller of claim 1, further comprising:
  a ring attached to an end of the handle and having:
    an annular surface defining a plane that forms a predetermined angle with respect to the longitudinal direction, and
    a curved outer surface.

8. The hand-held controller of claim 7, wherein at least part of the ring or is transparent to infrared light.

9. The hand-held controller of claim 7, wherein at least part of the light emitted by the optical proximity sensor exits through the curved outer surface of the ring.

10. A hand-held controller, comprising:
  a handle extending in a longitudinal direction, the handle shaped and dimensioned to be grasped by a hand of a user; and
  an optical proximity sensor mounted on a right side surface of the handle and configured to detect whether the hand of the user grasping the handle is a right hand of the user or a left hand of the user, detecting whether the hand is the right hand or the left hand comprises:
    determining a time interval between the optical proximity sensor emitting light and the optical proximity sensor receiving reflected light from the hand;
    determining whether the time interval is higher than a threshold; and
    determining, responsive to the time interval being higher than the threshold, that the hand is the left hand and, responsive to the time interval being lower than the threshold, that the hand is the right hand.

11. The hand-held controller of claim 10, wherein the optical proximity sensor is configured to emit light in a direction of the hand of the user grasping the handle.

12. The hand-held controller of claim 11, wherein the light is infrared light.

13. The hand-held controller of claim 10, wherein the optical proximity sensor comprises a photodiode or phototransistor configured to receive reflected light from the hand of the user grasping the handle and generate sensor signals corresponding to the reflected light, the sensor signals indicating whether the hand of the user grasping the handle is the right hand of the user or the left hand of the user.

14. The hand-held controller of claim 10, wherein at least part of the handle is transparent to infrared light.

15. The hand-held controller of claim 10, wherein at least part of the light emitted by the optical proximity sensor exits through a side surface of the handle.

16. The hand-held controller of claim 10, further comprising:
  a ring attached to an end of the handle and having:
    an annular surface defining a plane that forms a predetermined angle with respect to the longitudinal direction, and
    a curved outer surface.

17. The hand-held controller of claim 16, wherein at least part of the ring or is transparent to infrared light.

18. The hand-held controller of claim 16, wherein at least part of the light emitted by the optical proximity sensor exits through the curved outer surface of the ring.

* * * * *